United States Patent [19]
Hock et al.

[11] 3,904,295
[45] Sept. 9, 1975

[54] METHOD AND APPARATUS FOR THE NO-CONTACT MEASUREMENT OF VELOCITIES, CHANGES IN RELATIVE POSITION, OR DISPLACEMENT PATHS

[75] Inventors: Fromund Hock; Knut Heitmann, both of Wetzlar; Dietmar Kaul, Solms, all of Germany

[73] Assignee: Ernst Leitz G.m.b.H., Wetzlar, Germany

[22] Filed: July 30, 1973

[21] Appl. No.: 383,780

[30] Foreign Application Priority Data
July 31, 1972 Germany............... 2237564

[52] U.S. Cl.......... 356/167; 250/237 R; 356/28; 356/111; 356/152; 356/156; 356/169
[51] Int. Cl.² ........................................... G01P 3/36
[58] Field of Search ......... 356/156, 163, 167, 111, 356/169, 28, 152; 250/237 R, 237 G; 324/160

[56] References Cited
UNITED STATES PATENTS

| | | | |
|---|---|---|---|
| 2,942,119 | 6/1960 | King et al. | 324/160 |
| 3,198,061 | 8/1965 | Hock | 250/237 G |
| 3,482,107 | 12/1969 | Hocck | 356/114 |
| 3,525,569 | 8/1970 | Gamertsfelder et al. | 356/28 |

Primary Examiner—Ronald L. Wibert
Assistant Examiner—Richard A. Rosenberger
Attorney, Agent, or Firm—Gilbert L. Wells

[57] ABSTRACT

Light diffracting or dispersing properties of an object dividing a wave front in angular differently oriented wave fronts are used for no-contact optical velocity-, acceleration-, change in relative position- or displacement path measurements of said object movable relative to a measuring head. No systematic markings affecting light phase or amplitude on the measuring surface are disposed in the depth of field of imaging system. Measurements are made respectively to one coordinate associated to one of the six possible spatial degrees of freedom of motion. The object under test and an optical component yielding sharply defined angular relationship among different but combined wave fronts are conjugatedly disposed in the imaging system. Light modulations produced upon changing the relative position are photoelectrically converted into signals exhibiting a frequency change proportional to linear or angular velocity variation. The measurement is improved by using components having negligible light absorption, and determining angular relationship among the wave fronts. Light fluxes from interaction among partial wave fronts containing information concerning the object movement, derived from solid angle areas of equal modulation phase are converted separately into photoelectrical signals having sinusoidally varying modulation characteristics with the respective measuring coordinate. The modulation period cycles are half as long as the statistical spatial frequency components of the object under test. The light energy proportions are split off from and outside the solid angle area of the illumination aperture. The electric signals produced are evaluated as direct or carrier-frequency signals with respect to the measured qualities desired.

33 Claims, 12 Drawing Figures

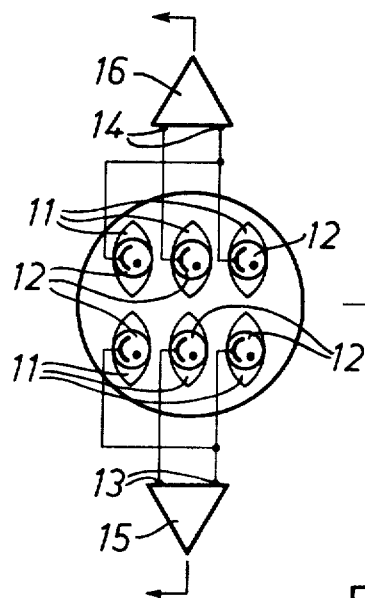
Fig. 1b
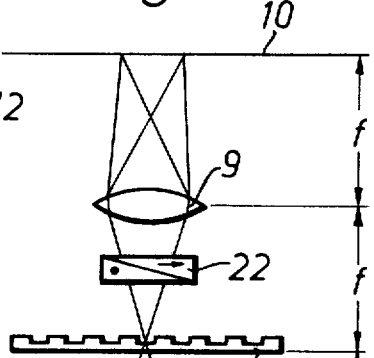
Fig. 1
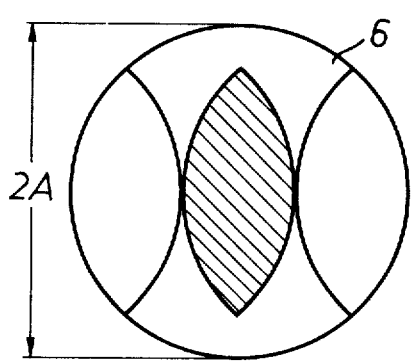
Fig. 1a
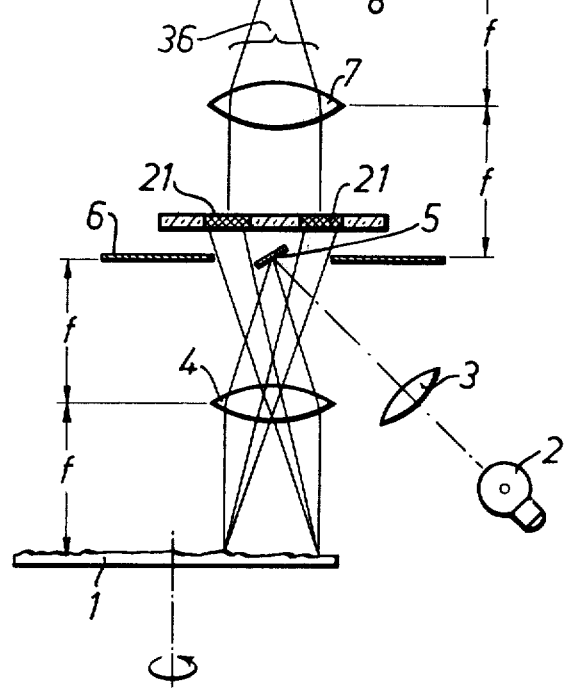

METHOD AND APPARATUS FOR THE NO-CONTACT MEASUREMENT OF VELOCITIES, CHANGES IN RELATIVE POSITION, OR DISPLACEMENT PATHS

CROSS REFERENCES TO RELATED APPLICATIONS

Applicants claim priority under 35 U.S.C. 119 for Application Ser. No. P 22 37 564.0, filed July 31, 1972, in the Patent Office of the Federal Republic of Germany.

The disclosure of U.S. patent application Ser. No. 283,967, filed Aug. 28, 1972, of Heitmann et al. now abandoned, and of application Ser. No. 333,514, filed Feb. 20, 1973, now U.S. Pat. No. 3,856,401 are incorporated herein.

Application Ser. No. 283,967 and the patents cited therein, e.g. U.S. Pat. Nos. 3,198,061; 2,772,479; and 3,482,107, and British Pat. No. 1,249,302 disclose the state of the art of apparatus for no-contact measurement and particularly disclose the use of a pyramidal grating, the method for converting the spatial frequency into a speed proportional time frequency, how the magnitude and direction is determined from the grating movement, the electronic circuitry used, how the magnitude and/or velocity are obtained, and how the push-pull signals are evaluated.

BACKGROUND OF THE INVENTION

The present invention relates to devices for the no-contact optical measurement of velocities, accelerations, changes in relative position, or displacement paths of an object movable relative to a measuring head where the object is light-diffracting or light-dispersing and thus divides a wave front into at least two differently oriented wave fronts. In the present invention no systematic markings affecting the light phase or light amplitude on the measuring surface elements disposed at the focus range of the imaging system are used. This measurement is carried out with reference to at least one coordinate axis associated with one of the six possible degrees of freedom of motion in space, wherein the measuring surface and an optical component providing sharply defined angular relationships among at least three different, mutually correlated wave fronts are disposed in conjugated relationship to each other in the imaging beam path, and wherein the light modulations produced during changes in the relative position are converted into electric signals by at least one photoelectric transducer and the signals exhibit a frequency variation proportional to the change in linear or angular velocity.

The state of the art of the present device may be ascertained by reference to U.S. Pat. Nos. 3,330,964; 3,419,330 and 3,609,009; British Pat. Nos. 915,078 and 1,249,302; German Published Applications Nos. 1,564,450; 1,623,912; 1,801,284 and 2,003,492; and French Published Applications No. 2,001,415; the disclosures of which are incorporated herein.

U.S. Pat. No. 3,330,964 discloses a photoelectric coordinate measuring system including the circuitry therefore. A diffraction grating angular rate sensor is disclosed in U.S. Pat. No. 3,419,330 and U.S. Pat. No. 3,609,009 discloses the state of the art of devices for deflecting incident light by acoustic waves.

Photoelectric velocity measuring devices are known, such as disclosed in application Ser. No. 283,967, wherein signals are derived from object surfaces without the use of systematic measuring marks and the data are evaluated for object velocities.

In such devices, which operate in accordance with Doppler-effect speed measuring methods operating with time coherent light (laser light), the measured objects produce a frequency shift proportional to the velocity components in the direction of the illuminating light and proportional to the velocity components in the direction of the signal light flux, to yield the amount of the velocity component by superposition of two beams with the aid of partially transmissive mirrors (measuring beam and reference beam, or two measuring beams of differing frequency shifts). Therefrom the measuring value is obtained, taking into account the angular relationships between the velocity vector and the beam directions.

Other devices of this type for producing signal sequences proportional to the displacement of an object contain a source of coherent monochromatic light and a linear grating illuminated thereby and connected with the movable object. This linear grating has the effect of a diffraction grating. Furthermore, means are provided for the masking and superposition of diffraction orders which are equal but opposed to each other and which are provided by the diffraction grating, as well as means for scanning the interference bands produced by the superposition (heterodyning).

In a similar apparatus as disclosed in U.S. Pat. No. 3,419,330, the grating, illuminated by incident light, is arranged on the periphery of a disk in order to determine the peripheral velocity.

Disadvantages of the Doppler procedures applied to statistical surfaces are the following: the limitation to a small measuring spot on the object surface, cost expenditure for the laser, the uncomfortable high signal frequencies connected with the small light wavelength, and the need for considering light wavelength and angular relationships in the calculation.

Velocity measuring methods wherein electric signals are cross correlated operate without the prerequisite of coherence of the light employed. These signals are obtained by providing at least two photoelectric receivers offset in the direction of motion of the object to be measured, on which, due to the motion of the object, the same object points are optically imaged in succession.

Electric signal correlators, such as disclosed in U.S. Pat. No. 3,330,964, require a storage means of controllable storage transit time and a complex circuitry susceptible to disturbances. They yield merely an average speed for the storage transit time and use the information content of the object surface available only to a small extent, and this results in small bandwidths of the measuring information.

Furthermore, a device is disclosed in British Pat. No. 1,249,302 wherein a calibrated object is imaged on a pyramidal or prismatic grating as a beam splitter of negligible light absorption in order to measure the velocity. This device lacks the directional identification of the measurement.

Furthermore, an "Electro Optical Shaft Angle Encoder Utilizing Laser Interferometry" has been disclosed by R. D. Kroeger of the Sperry Rand Corporation wherein, for obtaining scanning signals of a higher frequency with respect to the movement of the grating, beam components of differing orders of diffraction are joined by beam-combining components and are caused to enter into interference.

Also conventional is the use of a phase grating as an optical component determining the angular relationships among at least three wave fronts.

It is furthermore known to employ a Wollaston prism as a beam-splitting or beam-combining element in the combination of higher frequency beam proportions of radiation impinging from different directions.

In order to determine the relative coordinates of object points according to two coordinates, d evice is known according to which two gratings rigidly connected with the object to be measured and correspondingly oriented are imaged on two separate linear gratings oriented in parallel to the coordinate directions. With two groups of respectively four photoelectric receivers, signals are separately derived from the resultant light beams which are proportional to the movement of the object.

Finally, devices are known wherein the spatial frequencies of structure distributions of the calibrated, moving object are correlated with a linear amplitude grid by imaging the object surface on the amplitude grid. The light which has penetrated the grid surface is combined at a photoelectric receiver and is converted into a signal containing a frequency component proportional to the object velocity.

These conventional grid correlators have an unfavorable useful signal-to-noise ratio. The useful signal contains a larger number of harmonics which can simulate an integral multiple of the measuring velocity.

A specialized further development of these devices is disclosed in application Ser. No. 333,514 wherein the linear amplitude grid is a photoelectric receiver grating wherein the even- and odd-numbered receiver strips are combined into respectively one signal output, the signals of which, after passing through a differential amplifier, yield a resultant signal which preferably contains only the harmonic components of the signal frequency corresponding to the spatial frequency components of the receiver structure and to the object velocity.

The push-pull method disclosed suppresses the spurious signal proportion caused by spatial frequencies of the object lying below the corresponding spatial frequencies of the correlation grating, but does not avoid the other disadvantage, namely the high cost expenditure in apparatus. Moreover, the technology of the photoelectric receiver strips restricts the spatial frequency range in the upward direction, so that high object magnifications and large total receiving areas become necessary in order to obtain even in the case of minor shifts of the object a large useful signal proportion with a correspondingly large number of strips. The conventional devices are unsuitable for being extended to two-dimensional measurements. Also, there is no characterization of the direction of movement by the signals from a single measuring field. As higher harmonics of the space frequency are not suppressed, erroneous measurements are possible.

SUMMARY OF THE INVENTION

Having in mind the limitations of the prior art, it is an object of the present invention to provide for the no-contact measurement of velocities, relative position changes, or displacement paths of a moving light-diffracting or light-dispersing object without systematic measuring markings for measurement in one or two coordinates. Only a minor cost expenditure as compared to the information thus obtained is an object and, in the simplest design, it is an object to operate with the light of a thermal or luminescent light source.

According to the present invention, with the use of one or several components determining the angular relationships among at least three wave fronts and having negligible light absorption, the modulatable light beams resulting from the interaction among these components and the image of the object, originating from solid-angle areas of the same modulation phase, are converted separately into photoelectric signals. The modulation characteristics of the photoelectric signals vary sinusoidally with the respective measuring coordinate, and the signal cycles of these photoelectric signals are half as long as the statistical position cycle proportions of the reference or dispersion parameters of the object measuring surface. The light energy proportions preferably transmitted by the optical system are split off from the solid angle area of the illumination aperture. The electric signals produced are evaluated as direct or carrier-frequency signals in a conventional manner with respect to the measured variables desired.

BRIEF DESCRIPTION OF THE DRAWINGS

The invention is best described by reference to the embodiments shown in the attached drawings, wherein:

FIG. 1 is a schematic plan view of an apparatus of the present invention for conducting a single coordinate measurement;

FIG. 1a is a detailed showing in a top view of the aperture stop of FIG. 1 located in the fourier plane of the imaging system;

FIG. 1b is a detailed showing in a top view of the photoelectric receiver arrangements used in FIG. 1;

DESCRIPTION OF THE PREFERRED EMBODIMENTS

Figure 2A:
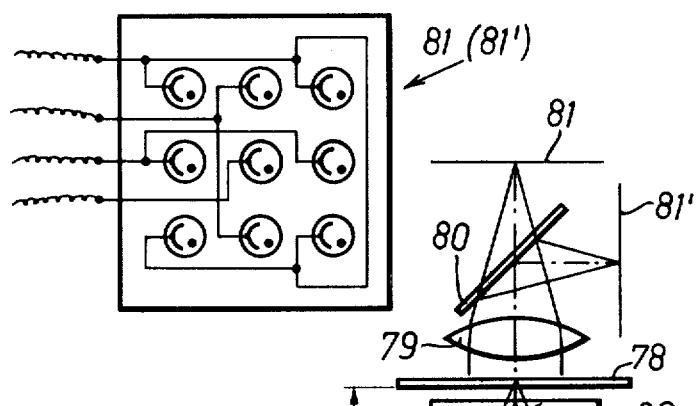
FIG. 2a is a detailed showing in a top view of the aperture stop of FIG. 2 located in the fourier plane of the imaging system.
Figure 2B:
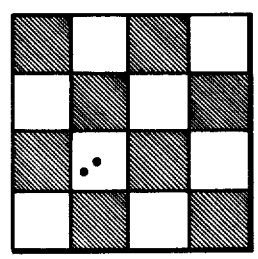
FIG. 2b is a detailed showing in a top view of the photoelectric receiver arrangements used in FIG. 2.
Figure 2C:
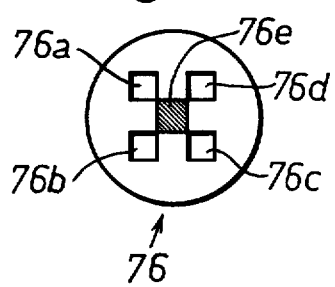
FIG. 2c is a detailed showing in a top view of the two-coordinate correlation grating of FIG. 2.

In FIG. 1, a circular disk 1 with a light scattering surface is illustrated as the object, the respective angular position of which is to be measured. This object 1 is illuminated by a light source 2 by way of a condenser 3, deflecting mirror 5, and an objective 4. The objective 4 sorts the light reflected by the object in accordance with the different scattering angles thereof in its focal plane, wherein an aperture stop 6 is disposed, so that each point on the focal surface is associated with a direction in the object space. A top view of the aperture stop 6 is shown in FIG. 1a. The two partial beams penetrating the aperture stop 6 and having cross sections corresponding to fusiformed shapes reproduce through an objective 7 an image of the light-dispersing surface in the plane of a correlation grating 8 constructed as a phase grid, which image contains only the position frequencies corresponding to the double slot of the aperture stop. For the plane of the stop 6, the mirror 5 acts as a barrier for suppressing the coherent background in the image and thus retains light which has not been modulated at the object. Due to the elimination of the coherent background in the image, the spatial frequency in the image is doubled with respect to the spatial frequency of the spatial frequency range of the object surface preferred by the stop position. The mirror 5 determines the solid angle of the illumination aperture. A maximum utilization of rotationally symmetrical optical systems is achieved by constructing the mirror surface effective as an illumination aperture stop as a crescent. The rear focal plane of the objective 4, illustrated as a circular surface in FIG. 1a and corresponding to the corrected aperture range with the diameter 2A of the objectives 4 and 7, is optically divided by three congruent fusiformed shapes.

The arrangement of the stop 6 and its design are chosen so that, after diffraction and thus correlation of the partial beams at the grating 8, a maximum of completely superposed partial images 11 of the aperture stop 6 from various individual surfaces result in the focal plane 10 of an objective 9 when imaging via the latter. The light producing the partial images 11 is converted into electric signals by photoelectric receivers 12 disposed within or behind the focal plane 10. Those photoelectric receivers 12 containing modulations with push-pull proportions are connected to the push-pull inputs 13, 14 of push-pull amplifiers 15, 16. The photoelectric receiving means employed may be differently used according to time or location.

The reason for using two objectives 4, 7 in the present case is that the illumination angle is to be filtered out at the object 1 and that the matching of the image of the measuring surface of the object to the gating 8 is to be rendered optimal and independent from focusing errors due to telecentric beam conductance at the object and image sides. These two objectives have identical focal length for a 1 : 1 imaging procedure, but have differing focal lengths for other imaging scales. The rear focal plane of the objective 4 is congruent with the front focal plane of the objective 7 (plane of the aperture stop 6). The measuring plane is approximately determined by the front focal plane of the objective 4, while the rear focal plane 10 of the objective 9 is disposed in the grating plane.

Due to the no-loss characteristic of the phase grating modulation and the resultant constancy of the entire light flux through the grating, reversals of the optical energy flow occur automatically between the various orders of diffraction corresponding to the grating constant of the correlation phase grating, and thus push-pull signals are produced.

In order to obtain a directional information rotary field defining and interlinked phase-shifted sinusoidal signals have to be generated. For this purpose phase shifters 21 are arranged in the proximity of the pupil symmetrically to the optical axis and produce, for orthogonal polarization direction of the light dispersed on the object 1, preferably quarter-wave phase shifts of the light waves (for reasons of symmetry, respectively one eighth-wave plate in the addition and subtraction position). A Wollaston prism 22 oriented to the main directions of the luminous vibration of the eighth-wave plates as well as to the grating 8 is arranged as a polarizing beam splitter in the beam direction behind the grating 8. This prism splits up beam proportions, the direction of diffraction of which are determined by the object 1 under test and the grating and which are mutually vertically polarized into partial beam groups having a modulation phase difference of $\pi/2$. The push-pull signals obtained from respectively one of these partial beam groups, polarized at eight angles to each other, then likewise exhibit a mutual phase difference which defines the direction of movement and different from $n\pi$.

In place of the polarization, it is also possible to employ the spectral position of partial intensities of the illuminating light for physical definition. The phase shifters 21 can, in this case, be replaced by a direct vision dispersion prism, and the Wollaston prism can be substituted by a further diffraction grating transverse to the grating 8 and having a spectral splitting characteristic. In order to introduce correction values for the rotary field angle resulting from the two linked signals, it is possible to insert additional variable phase shifters into the beam path which measurably displace the light wave phase between the aperture images geometrically superposed by the correlation grating.

In the embodiment illustrated in FIG. 1, these phase shifters between the objectives 4 and 7 could be a pair of internal sliding lenses, the total power of refraction of which is zero, or a double rotating wedge. With beam deflection, the use of a rotary mirror would be possible. Also a planar-parallel plate and a swivel plate in the proximity of the object or grating could take over this function.

Since the correlation grating 8 is a phase grid, brightness changes which are modulated in push-pull relationship are produced in the superposed partial images 11 of the aperture stop slots, multiplied by the grating diffraction. The brightness changes in the focal plane 10 contain only purely harmonic signal proportions, when the spatial frequency filtering carried out in the stop system 5,6 ensures that there is no overlapping of the solid-angle proportions (orders of diffraction). These solid angle proportions define the spatial frequency ranges better than in the spatial frequency ratio 1 : 2 in one coordinate direction (i.e., corresponding to spatial frequency ranges of less than one octave in bandwidth), even when the diffraction dispersion dependent on the wavelength is considered.

The correlation grating can be constructed as a phase grid which diffracts in one or two coordinates. The spacings of the centers of the aperture stop slots which filter the spatial frequencies must be selected so that they fit the diffraction angles of the grid.

The imaging scale between the statistical object surface and the correlation grating determines the scale factor between the filtered-out spatial frequency of the object and the spatial frequency of the correlation grating.

If the object surface correlated with the grating does not have a too strongly depolarizing effect (metallic surfaces in incident light), then it is also possible to use carrier-frequency measuring methods which are analogous to the two-frequency laser interferometer method. By illuminating the dispersing surface or, upon beam reversal, the correlation grating with two mutually coherent partial waves of varying optical frequency, the polarization conditions of which are mutually complementary, and by providing that these complementary partial beams pass separately through aperture stop openings respectively symmetrical to the illumination aperture, then frequency-modulated signals can be obtained behind the grating correlator which, when the object is at rest, have a frequency corresponding to the frequency difference of the two partial waves. Two partial waves of the afore-described properties can be obtained, as is known, from a polarization-neutral, optical resonator in a magnetic field, wherein a single-mode laser path is installed. Also a polarization-neutral laser resonator with two axial modes which, for example, have a frequency spacing of 500 megahertz and are polarized at right angles to each other represents a light source which can be utilized in this connection.

Equivalent to a two-frequency laser is the illumination of the object with the light of the two + 1 diffraction orders of a moving grating, after these beam proportions have been polarized with respect to each other linearly or in a circulary complementary manner, and have then again been combined into the same direction. In the present case, a moving ultrasonic wave as disclosed in U.S. Pat. No. 3,609,009 is advantageously employed as the illuminating grating. Also other methods for producing rotating or rotary-pendulating linear polarizations are suitable for producing carrier-frequency signals.

In the carrier-frequency measuring process of the present invention, a reference signal is derived, against which the measuring signal is compared with respect to frequency and phase. Therefore, the generation of rotary-field signals is unnecessary, since the arithmetic sign of the frequency difference of measuring signal and reference signal already represents the directional information.

When phase gratings are used which diffract an incident wave in the respective diffraction coordinate direction only in two orders of diffraction, the production of push-pull signals is eliminated in the above-described spatial frequency filtering procedure. Thus, when the spatial frequency filtering step is omitted, while the restricted illumination aperture is retained, and when the procedure is operated with objectives for imaging the object surface which have large apertures, based on the spatial frequency of the correlation grating, then phase structures of the object will produce push-pull signals, whereas amplitude structures of the object, since connected with in-phase modulations, are suppressed.

If sufficient components with a high signal level with respect to the signal noise are present in the spectral density function of the spatial frequencies of the object, and if these fit to the spatial frequency of the correlation grating, conventional forward-backward counting techniques and rotary field cycle subdividing techniques can be applied to the processing of the rotary field signals.

In contrast to the methods of Doppler interferometry wherein the scanned surface must remain small, the method employed herein has the feature that the probability of exceeding the required signal-to-noise ratio in a statistically diffracting and dispersing object surface is increased with the size of the correlated surface areas.

The velocity evaluation of the signals will likewise follow conventional methods, for example the proposed rotary-field tachogenerator solution disclosed in West German Patent Application No. P 21 27 483.9.

Figure 2:
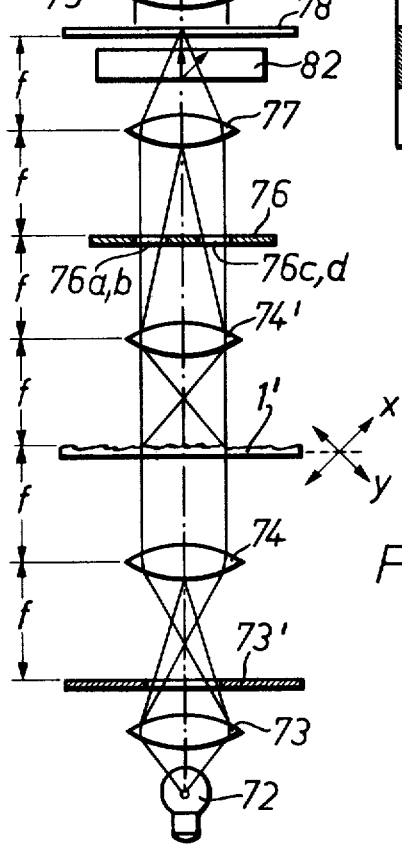
FIG. 2 is a schematic plan view of an apparatus of the present invention for conducting a two-coordinate measurement.

FIG. 2 illustrates a transillumination object 1', the displacement of which is to be measured in two coordinate directions $x$, $y$. A lamp 72 illuminates the object 1' from below by way of a condenser 73 and a collimator 74. In the forward focal plane of the collimator 74, between the condenser 73 and the collimator 74, a preferably square light stop 73' is disposed, so that the illuminating light at the object has a telecentric beam path and contains only rays of a defined directional range. The object 1' proper is arranged in the forward focal plane of an associated additional objective 74'. An aperture stop 76 is provided in the rear focal plane of this additional objective.

FIG. 2$a$ shows a top view of this aperture stop 76, the region 76$e$ of which, disposed in the proximity of the axis, has the light stop 73' imaged thereon and is constructed to be opaque. In symmetry to the center, four square transmission areas 76$a$–76$d$ are disposed, the sizes and positions of which are associated with diffraction angles corresponding to the spatial frequency components to be correlated.

A further objective 77 is associated with the aperture stop 76 at the spacing of its focal length. This objective directs the passing light beam, in accordance with the orders of diffraction, to a two-coordinate grating 78 arranged in the rear focal plane of the objective 77.

The two-coordinate correlation grating 78 is constructed as a square checkerboard grating as shown in the illustrated embodiment of FIG. 2$c$. This grating is associated with a polarizing image-splitting element 82 which causes a splitting action in the direction of the diagonal of the grating 78, the components of which, in the grating direction, correspond to one-eighth of the grating constant. By means of an objective 79 connected thereafter, as well as a polarizing beam splitter 80, the plane of the aperture stop 76 is imaged, magnified in overlapping relationship by the diffraction, onto two arrangements 81, 81' of the photoelectric receivers.

As shown in top view by FIG. 2$b$, the arrangements 81, 81' each consist of nine photoelectric receivers arranged in a square and these are joined respectively in four groups. The photoelectric receivers of the four corners of the square form one group, the central receiver forms the second group, and respectively two of the remaining four receivers, arranged symmetrically to the center, form the third and fourth groups. From a phase comparison of the electric signals of arrangement 81 with those of arrangement 81', directional information is obtained regarding the movement of object 1' in accordance with the two coordinate directions $x$, $y$.

In order to adapt to different objects to be measured, the grating constant of the correlation grating can be varied in a particularly simple way of realizing this grating by an ultrasonic wave, the wavelength of which is controlled by varying the excitation frequency or the sonic velocity.

Figure 3:
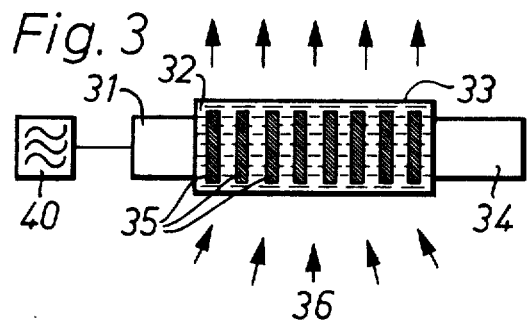
FIGS. 3 and 3a are plan views of supersonic correlation gratings.

One embodiment for this purpose is shown schematically in FIG. 3. A supersonic generator 31 is acoustically coupled to a liquid 32 contained in a glass vessel 33 and is fed by a generator 40. The glass vessel 33 is constructed and arranged so that it is in the light beam path 36 coming from the objective 7 (FIG. 1). The moving supersonic waves 35 impinge on a reflection-free absorber 34 of a conventional type (e.g. according to Debye-Sears), so that only the undisturbed traveling wave is effective as a phase grating for the laterally impinging radiation 36. For the carrier-frequency measurement, it is possible to employ, in place of an optically derived reference signal, a reference signal obtained from the driving current of the acoustic generator 31. By exciting the supersonic wave with harmonic intensities of a basic component mixed in a suitable proportion (Fourier synthesis), it is possible to produce structures for the correlation grating which diffract identical light intensities into different orders of diffraction, preferably into the + first and into the + third orders, in order to obtain equal intensity modulations at the associated receivers.

The advantages of such traveling supersonic waves are impaired, as experience has shown, by the low stability of their wavelength. In order to stabilize these grating position frequencies, they are, therefore, compared with the position frequency of a fixed reference grating by way of an auxiliary beam path. From the moire phases thus produced between different points of the two groups, a control signal is obtained for the supersonic driving frequency. Such a control signal can be obtained from a comparison of the angles of diffraction of a monochromatic light of known color diffracted on the supersonic field to be stabilized with a predetermined required diffraction angle, or from a comparison of interference phenomena between various diffraction orders of this light with predetermined desired patterns.

Figure 3A:
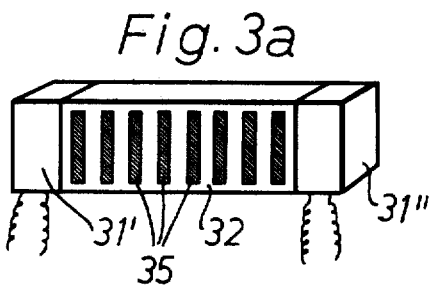

As illustrated in FIG. 3a, it is also possible, in an alternative to the above-described procedure, to improve the effectiveness of such a device using supersonic waves as the phase grating by simultaneously influencing the liquid column or the solid body provided in place thereby by two supersonic generators 31', 31" effective at opposite ends of the medium 32 which can be operated at differing frequencies. By varying at least one of the frequencies, the wave pattern in the medium can readily be controlled in its traveling speed and its direction of motion. In this arrangement, as contrasted to the system of FIG. 3, all sonic energy is used to build up the grating.

Figure 4:
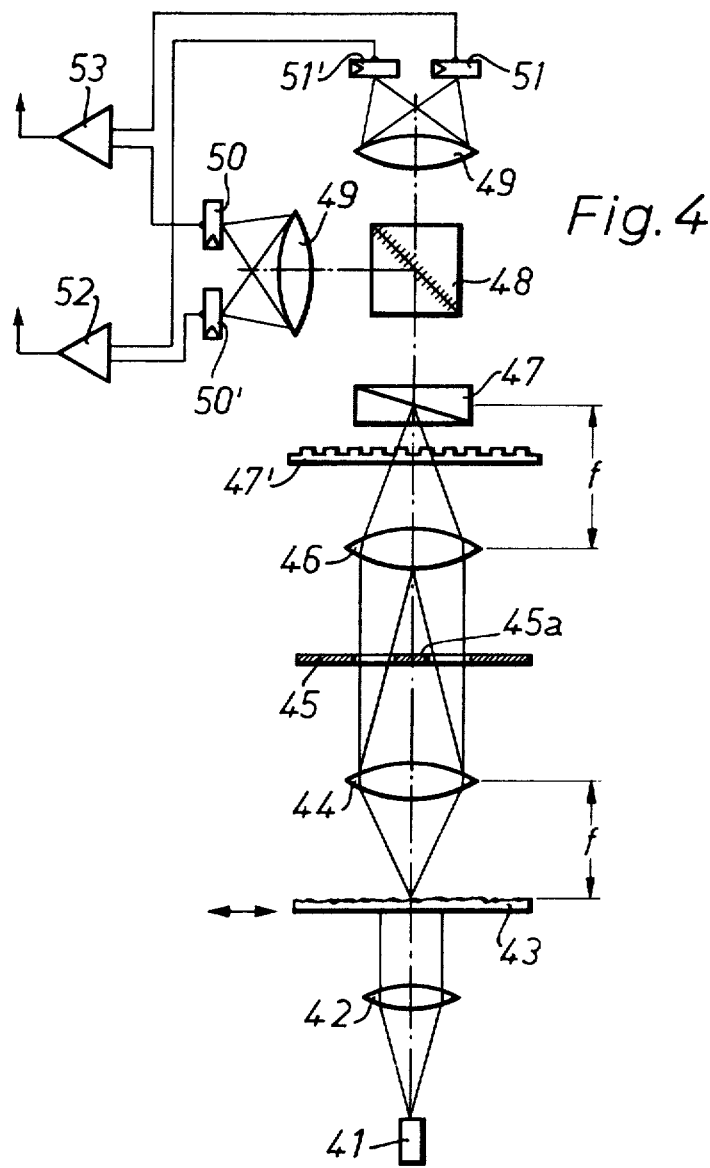
FIG. 4 is a schematic plan view of an apparatus of the present invention for conducting a two-coordinate measurement without a correlation grating.

In FIG. 4, a laser light source 41 illuminates a statistical transilluminated object 43 via a condenser 42. Light diffracted on this object, as well as non-diffracted light, are imaged by an optical system 44 onto a filter stop 45. This stop is constructed so that it eliminates, by means of the stop means 45a, the direct central, unmodulated proportion of the illuminating light, as well as such light diffracted on object structures, the spatial frequencies of which deviate by more than one-half octave in the upward or downward directions from the spatial frequency to be correlated. The light from wave front portions passed by the filter stop 45 and diffracted from the illuminated is combined by a second imaging optical system 46 in the rear focal plane thereof at a Wollaston prism 47. The splitting angle of the Wollaston prism is matched to the incidence angle of the beam proportions of the different partial wave fronts. In front of the Wollaston prism 47, a phase grating 47' of a high spatial frequency, yielding only two equally intense orders of diffraction, is mounted in such a close proximity that the light changes between respectively two partial objective pupil images geometrically separated behind the Wollaston prism have a phase shift unequal to $n\pi$ ($n$ = integer). The beam components with orthogonal polarizing directions combined into a common direction in the direction of the beam behind the Wollaston prism 47 are brought to interference on a polarizing beam splitter 48 oriented at an angle of 45° to the main directions of luminous vibration of the Wollaston prism 47. Then, these components are fed, via collecting optical systems 49, to four photoelectric receivers 50, 50', 51, 51' so that the output signals of associated receivers (50, 50') and (51, 51') each exhibit a phase shift which is unequal to $n\pi$. The pairs of photoelectric receivers 51, 51' and 50, 50' are matched in their position to the splitting direction of the grating 47'. The outputs of these receivers are connected with the input terminals of associated push-pull amplifiers 52, 53.

The function of the device as described as far is as follows: Upon a movement of the measuring object 43 normal to the optial axis in parallel to the plane of the drawing, the two above-mentioned orders of diffraction ("channels"), during the traversal or one spatial frequency cycle of the spatial frequency component of the object structure to be correlated, are alternatingly exposed to light respectively exactly once. The occurrence of this alternating signal is thus characteristic for the presence of the spatial frequency component to be correlated, and its clock frequency is characteristic for the velocity of motion thereof. The optical components 44–47, as well as their arrangement, as can readily be seen, serve for optically freezing this alternating signal from disturbing proportions of a deviating frequency. The push-pull amplifiers 52, 53 serve for the same purpose by an electrical mode of operation. When the beam integrator is constructed advantageously as a double-refracting pair of internal sliding lenses, the splitting angle thereof and thus the spatial frequency of the object to be correlated can be varied.

Figure 5:
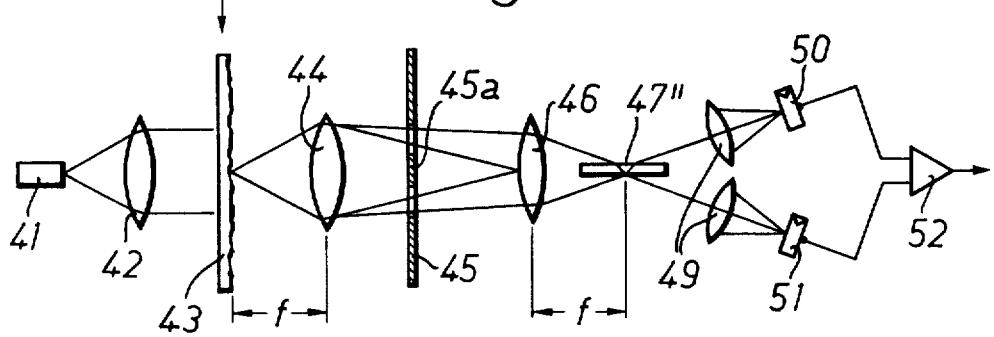
FIG. 5 is a schematic plan view of an apparatus of the present invention for conducting the measurement with a partially reflective plate as the beam-integrating element.

The device shown in FIG. 5 has the same function as that of FIG. 4, and the same reference numerals are used to denote analogous components. For beam integration (components 47, 48 of FIG. 4), a single, partially reflective plate 47" is provided in this instance.

Figure 6:
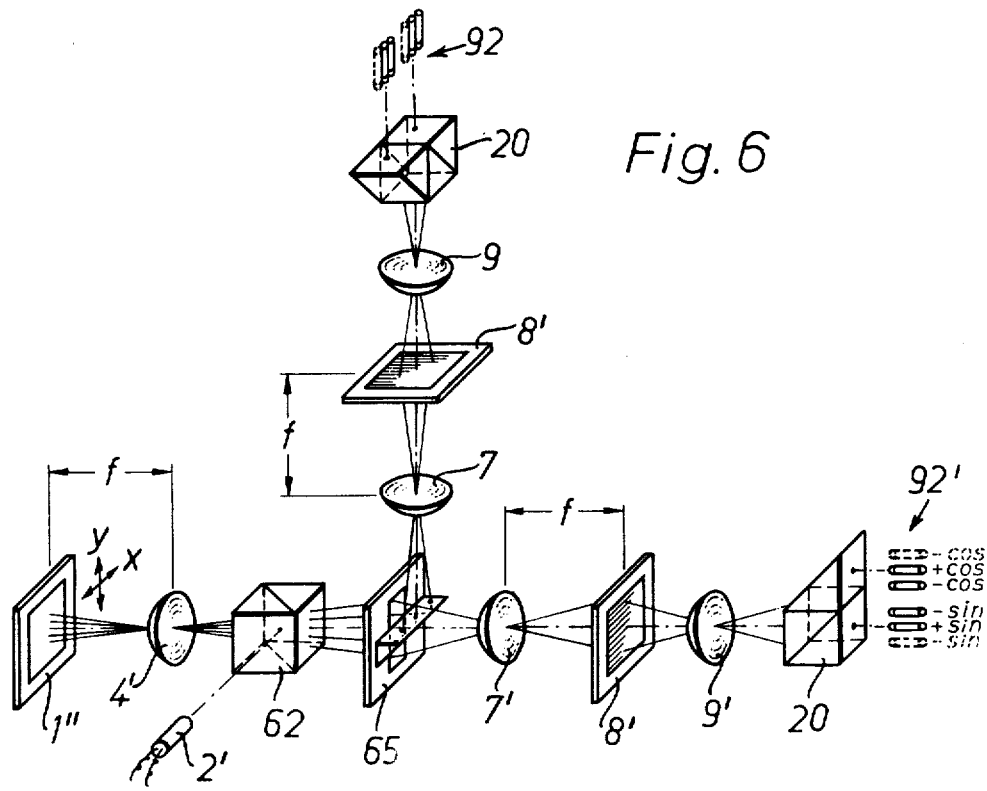
FIG. 6 is a schematic perspective view of an apparatus of the present invention for conducting a two-coordinate measurement using two separate linear gratings.

FIG. 6 shows a further device for conducting the procedure of the present invention, wherein an object 1" is illuminated by a light source 2 via a splitter 62 and an optical system 4' with direct light. The object 1" is displaceable in two coordinate directions $x$, $y$. By means of the optical systems 4', 7', the object is separately image on two linear gratings 8', 8". The direction of division of the grating 8' is in parallel with an x-displacement, and the direction of division of the grating 8" is oriented in parallel with a displacement along the y-axis. The beam path is parallel between the optical systems 4' and 7'. The beam path is split up by a spatial frequency filter 65 as illustrated. The light deflecting optical components of the filter 65 are designed so that they effect, in addition to the splitting of the beam, also a quarter-wave phase shift between beam components differing by 90° in the polarization direction. Accordingly, correspondingly oriented polarizing beam splitters 20 are inserted after the optical system 9', which splitters conduct the modulated beam to two times three photoelectric receivers associated with the x- and y-coordinate, respectively. These receivers are arranged in groups 92 and 92', respectively. Three receivers each are associated with the filtered-out orders of diffraction −1, 0, and +1. The signal phases are symbolized by the trigonometric functional symbols of the displacement paths.

Of course, additional measured variables can be derived from the primary measured data according to this invention, for example, it is possible to obtain, from the peripheral speed $u$ of an object, wherein at least partial areas of the periphery are disposed at the depth of field of the focus range of the imaging optical system, the circumferential radius $r = (u/\omega)$, when the rotational speed $\omega$ is known etc.

Also, the conventional temperature compensation methods can be applied to devices of the present invention. In particular, thermal expansion differences of object and correlation grating and tilt errors in the measuring structure can be compensated for by way of the displacement of the optical components, by way of the deformation of the surfaces, or by way of temperature-dependent refractory powers.

In addition to the above embodiments, the following procedures are also included in the concept of the invention.

In a particular embodiment the procedure is characterized in that in the beam path, after the interaction of the image and the optical element 8, 47, disposed in the image plane and linking at least three different wave fronts with one another, light fluxes from solid angle areas, which continue the partial beam regions of the imaging process directly or in a diffracted way, are converted in groups into photoelectric signals aftere being modulated separately or in-phase; and that inputs of push-pull amplifiers 14, 15, 52, 53 are fed with output signals of phase-opposed modulation proportions, which are balanced so that the signal proportions corresponding to direct light fluxes or to equally modulated light fluxes are suppressed.

Another embodiment is characterized in that, for obtaining direction information on the measuring movements, at least two photoelectric signals are produced, the modulation characteristics of which, which are in a position cycle according to the measuring coordinate, have phase shifts in the position phase of $\varphi \neq \pi$, preferably $\pi/2$; and that, in photoelectric receivers 12, 50, 51 used differently with respect to locality or time, by geometric or preferably physical beam splitting of the measuring surface of the object 1, 43, in case of geometric splitting at least two surface elements, or in case of physical beam splitting partial light fluxes associated with the total area covered by the imaging step, are converted into these signals.

Yet another embodiment is characterized in that for obtaining directional information on the measuring movements, at least two photoelectric, carrier-frequency signals are produced, the heat-frequency cycles and/or modulation phases of which contain the information on the measuring movement, wherein only one of the signals correlated with a measuring coordinate, namely the measuring signal, is obtained from light fluxes which have traversed all stages of the optical arrangement, whereas the other signal, namely the reference signal, which an also be common to several measuring coordinates, is previously derived from light flux proportions in the beam path or from electric modulation signals.

Still another embodiment is characterized in that, when light wherein only components are contained having a wavelength ratio of smaller than 0.5 is used, a diffraction grating is provided as the optical component 8 which determines the angular relationships between at least three different, mutually linked wave fronts and which suppresses, preferably by the phase fluctuation and the area relationships of the phase-shifting structural elements, any direct passing or regularly reflected light in the wavelength region effective at the photoelectric receivers.

A further embodiment is characterized in that, when at least chronologically coherent illumination is used, there is provided as the optical component determining the angular relationships among at least three different, mutually linked wave fronts, a double-refractory prism or lens combination or dielectric laminated packs 47 which are in conjunction to the measuring surface of the object.

A particular embodiment is characterized in that, when at least chronologically coherent illumination is used, there is provided, as the optical component determining the angular relationships among at least three different, mutually linked wave fronts and disposed in the space of the plane of the object imaging system in conjunction to the measuring surface, a preferably polarization-neutral, partially transmissive mirror 47''the plane of which is disposed in the angle bisector of at least two partial beams impinging on both sides of the partially transmissive mirror and together defining the image.

Yet another embodiment is characterized in that, of the rays effecting the imaging, at least two partial beams are made to participate in the production of the image by means of a beam guiding means 6, 45 effective as an at least two-slotted imaging aperture stop, the respective main positions and/or directions of these partial beams being preferably oriented with respect to each other so that the directional relationships of these main beams correspond to the directions determined by the optical component 8, 47 of negligible light absorption; and that the beam guiding means, by beam eliminators or deflectors, is constructed so that imaging aperture zones continuing the illumination aperture zones remain excluded from the participation in the production of the image; and that the solid angle regions of the partial beams contributing toward the imaging operation are preferably congruent with each other.

Still another embodiment is characterized in that, in the case of a geometrical separation, the component of negligible light absorption 47, which determines the angular relationships among at least three different mutually linked wave fronts, has at least two partial areas, the structures of which are displaced with respect to each other so that the desired phase positions of the position-periodic light modulation characteristics are produced; and that, in symmetry to these partial areas, geometrically separated optical components 49 are provided which assign the light fluxes through these partial areas to photoelectric receivers.

The apparatus is further characterized in that, in the case of a partially geometrical and partially physical separation, a diffraction grating 47' or Wollaston prism is disposed in the space behind the imaging aperture plane and in front of the image plane in parallel to the latter, which divides the image in at least two partial images arranged in the same plane and also splits up images of the openings of the aperture stop plane reproduced behind the image plane so that each of the partial images in the image plane lying in conjugation to the object is associated with at least two images of the openings of the aperture stop plane by means of the light beams connecting same.

Yet another embodiment of the apparatus is characterized in that, in the case of physical beam division, light of orthogonal oscillation components of the light polarization or of different light frequencies is subjected, on the way of the partial beams providing the imaging, between the measuring plane of the object 1 and the image plane in conjugation therewith between the partial beams of the imaging, is exposed to different phase differences and/or phase shifts which amount preferably to $\pi/2$, caused by providing in partial beams of the imaging various, influencing components 21, such as Wollaston prisms, Savart plates, mica plates, total reflective phase-shifting surfaces, or dispersion prisms or dispersing plates; and that the light fluxes, after traversing the object imaging section of the optical arrangement are separated in accordance with polarization and are fed to associated photoelectric receivers 12.

A further embodiment of the apparatus is characterized in that the optical component which creates sharply defined angular relationships among at least three wave fronts is an electroacoustic light modulator consisting of two mutually spatially oriented sound generators 31', 31" radiating preferably at differing frequencies, with an interposed optical medium 32 to be excuted as disclosed in U.S. Pat. No 3,609,009.

A further embodiment of the photoelectric incremental transducer for the two-coordinate measurement of object displacements is characterized in that the measuring object is imaged by means of an optical system having a parallel beam path separately onto two linear gratings disposed in parallel to the measuring coordinate directions with regard to their direction of lines on the grating; that a spatial frequency filter is arranged in the parallel beam path which filters out, for each coordinate direction, the light of the 0-th and + 1st order produced by diffracction at the measuring object and simultaneously produces between two orthogonal polarization directions in the filtered-out light an optical path difference of $\lambda/4$; that, for separating the beam paths pertainint to each coordinate direction, light-deflecting optical components are provided in the spatial frequency filter; and that the measuring light for each coordinate, split up separately by polarizing splitters, is fed in accordance with its phase difference to six photoelectric receivers associated with the 0-th and + 1st orders of diffraction.

We claim:

1. A method of measuring a property of movement of a light-dispersing object in at least one coordinate direction, comprising the steps of:
    a. selecting from the light modulated at said object at least two differently oriented beams and utilizing said beams for forming an optical image of said object;
    b. determining the solid angles of said beams;
    c. suppressing light unmodulated or respectively dispersed into very large angles at said object;
    d. causing at least one optical component having negligible light absorption and the property of determining the angular relationships among at least three optical wave fronts, to further modulate light fluxes derived from solid angle areas of said imaging beams having equal modulation phase;
    e. utilizing each respective one of said further modulated fluxes to generate electrical signals having signal periods each equal to one-half of a signal period determined by parameters of said light dispersing object and having modulation characteristics that vary sinusoidally with respect to the associated coordinate direction; and
    f. evaluating said signals to produce output signals indicative of the property of movement.

2. A method as claimed in claim 1, wherein the optical component is situated in the image plane set up by said beams.

3. A method as claimed in claim 2, wherein said fluxes being derived from solid angle areas of said imaging beams having equal modulation phase, are determined by the properties of said optical component and by the angular position of individual light fluxes incident on said optical component.

4. A method as claimed in claim 1, wherein said evaluating step includes the steps of selecting and combining said electrical signals for further producing signals having push-pull components, and feeding said further signals to input means of a push-pull amplifying means thereby to suppress mutually similar proportions in respective signals in said further signals.

5. A method as claimed in claim 4, wherein at least two electrical signals are produced to have periodic modulation characteristics associated with a given coordinate direction.

6. A method as claimed in claim 1, comprising the step of splitting said imaging beams into at least two components, each of which is employed in the production of at least two signals, which have relative phase displacements different from $n$, where $n$ is integer.

7. A method as claimed in claim 6, wherein said signals are indicative of the direction of the relative movement.

8. A method as claimed in claim 6, wherein said splitting step takes place in geometric beam splitting means, light proportions from at least two surface elements of said light dispersing object being separately fed to a photoelectric receiving means.

9. A method as claim in claim 6, wherein said splitting step takes place in physical beam splitting means and individual mutually distinguishable light proportions from the whole surface of said light dispersing object being imaged are separately fed to photoelectric receiving means.

10. A method as claimed in claim 1, producing at least two carrier frequency signals, which provide beat frequencies or modulation phases indicative of the direction of the relative movement, one of the carrier frequency signals being associated with a given coordinate direction and being derived from light proportions which have passed through the optical component, the other one of the carrier frequency signals being derived from light proportion in the light path ot the optical components or from electrical modulation signals.

11. Apparatus for measuring a property of movement of a light dispersing object in at least one coordinate direction comprising:
   a. a light source, which is arranged to illuminate said object;
   b. means selecting at least two differently oriented beams from light modulated at said object, determining the solid angles of said beams and suppressing light unmodulated or respectively dispersed into very large angles at said object;
   c. optical imaging means to form an optical image of said object;
   d. at least one optical component, having negligible light absorption and the property of determining the angular relationships among at least three optical wave fronts, to further modulate light fluxes from said angle areas of said imaging beams having equal modulation phase;
   e. photoelectric receiving means producing an individual electrical signal from each respective one of said further modulated fluxes; and
   f. evaluating means to produce from said signals an output signal indicative of the property of movement.

12. Apparatus as claimed in claim 11, wherein said light source illuminates the object with coherent light.

13. Apparatus as claimed in claim 11, wherein said optical component comprises a phase grating arranged to suppress light of the range of wavelengths and unmodulated light at the object.

14. Apparatus as claimed in claim 11, wherein said optical component comprises a bi-refringent component selected from a set of prisms, a set of lenses and a dielectric layer assembly, wherein the bi-refringement component is situated in a plane to be located in a position conjugate to the object with respect to the optical imaging means.

15. Apparatus as claimed in claim 11, comprising a semi-reflector within said optical component having a part thereof situated in a plane to be located in a position conjugated to the object with respect to the optical imaging means.

16. Apparatus as claimed in claim 15, wherein the semi-reflector is constructed to act independently of the state of polarisation of the light incident thereon.

17. Apparatus as claimed in claim 15, wherein said semi-reflector is a non-polarizing mirror having planar surfaces in parallel to each other and representing the bisector of an angle set up between at least two partial beams of said imagining light being incident on respectively opposite sides of said planar surfaces of said mirror.

18. Apparatus as claimed in claim 11, comprising an aperture stop provided with at least two apertures to define at least two light bundles in the imaging light, which have relative angular positions of the principal rays corresponding to the preferred relative angular positions defined by the optical component.

19. Apparatus as claimed in claim 18, wherein said aperture stop comprises portions so selected from optically absorbing and deflecting portions that unmodulated light from the object is prevented by said aperture stop from reaching the image.

20. Apparatus as claimed in claim 18, wherein the apertures define individual solid angle areas for the respective light bundles, the solid angle areas being of mutually equal size.

21. Apparatus as claimed in claim 11, wherein said optical component comprises beam splitting means of geometrical or physical property for splitting the imaging light into at least two proportions, wherein said component comprises at least two joint surface structures displaced relative to one another as to define periodic phase modulation characteristics, and wherein geometrically separate optical means being associated with the respective surface structures to guide light from the individual surface structures to respective photo-electric receiving means.

22. Apparatus as claimed in claim 21, wherein said optical component comprises a phase grating being provided in the light path from an aperture stop to the plane of the image to define a plane parallel to the plane of the image, and being arranged to split the image into at least two co-planar partial images and so to split images, formed behind said image plane, of the aperture stop that with each of the co-planar partial images, when disposed to be conjugated to the object with respect to the imaging means there are associated by correspondingly positioned light flux portions at least two images of the aperture stop.

23. Apparatus as claimed in claim 22, wherein said physical beam splitting means and optical means are Wollaston prisms disposed in the paths of respective light bundles to the optical component, the paths being defined by an aperture stop, the optical means being arranged to introduce different path differences or phase displacements between light components of mutually orthogonal polarisation direction or of different frequency in the light bundles, wherein said beam splitting means are arranged to split the light from the optical component into light proportions of different polarisation direction or of different frequency respectively and to direct the light proportions to respectively associated photo-electric receiving means.

24. Apparatus as claimed in claim 23, wherein the magnitude of the phase displacements between the light component is $\pi/2$.

25. Apparatus as claimed in claim 21, wherein said optical component comprises a Wollaston prism being provided in the light path from an aperture stop to the plane of the image to define a plane parallel to the plane of the image and being arranged to split the image into at least two coplanar partial images and so to split images formed behind said image plane of the aperture stop that with each of the coplanar partial images, when disposed to be conjugated to the object with respect to the imaging means there are associated by corresponding positioned light flux proportions at least two images of the aperture stop.

26. Appparatus as claimed in claim 21, wherein said physical beam splitting means and optical means are Savart plates disposed in the paths of respective light bundles to the optical component, the paths being defined by an aperture stop, the optical means being arranged to introduce different path differences or phase displacements between light components of mutually orthogonoal polarization directions or of different frequency in the light.

27. Apparatus as claimed in claim 21, wherein said physical beam splitting meand and optical means are mica plates disposed in the paths of respective light bundles to the optical component, the paths being defined by an aperture stop, the optical means being arranged to introduce different path differences or phase displacements between light components of mutually orthogonal polarization directions or of different frequency in the light.

28. Apparatus as claimed in claim 21, wherein said physical beam splitting means and optical means are totally reflecting phase displacing means disposed in the paths of respective light bundles to the optical component, the paths being defined by an aperture stop, the optical means being arranged to introduce different path differences or phase displacements between light components of mutually orthogonal polarization directions or of different frequency in the light.

29. Apparatus as claimed in claim 21, wherein said physical beam splitting means and optical means are dispersion prisms disposed in the paths of respective light bundles to the optical component, the paths being defined by an aperture stop, the optical means being arranged to introduce different path differences or phase displacements between light components of mutually orthogonal polarization directions or of different frequency in the light.

30. Apparatus as claimed in claim 21, wherein said physical beam splitting means and optical means are dispersing plates disposed in the paths of respective light bundles to the optical component, the paths being defined by an aperture stop, the optical means being arranged to introduce different path differences or phase displacements between light components of mutually orthogonal polarization directions or of different frequency in the light.

31. Apparatus as claimed in claim 11, wherein the optical component comprises an electro-acoustic light modulator, which comprises two acoustic generators to excite an optical medium situated therebetween.

32. Apparatus as claimed in claim 31, wherein the two individual acoustic generators are constructed to produce waves of respectively different frequency.

33. Apparatus as claimed in claim 11, wherein the apparatus described is used as an incremental measuring device that forms electrical signals by the relative movement between a fixed point and at least one grating, for example a phase grating.

* * * * *